United States Patent Office 3,327,205
Patented June 20, 1967

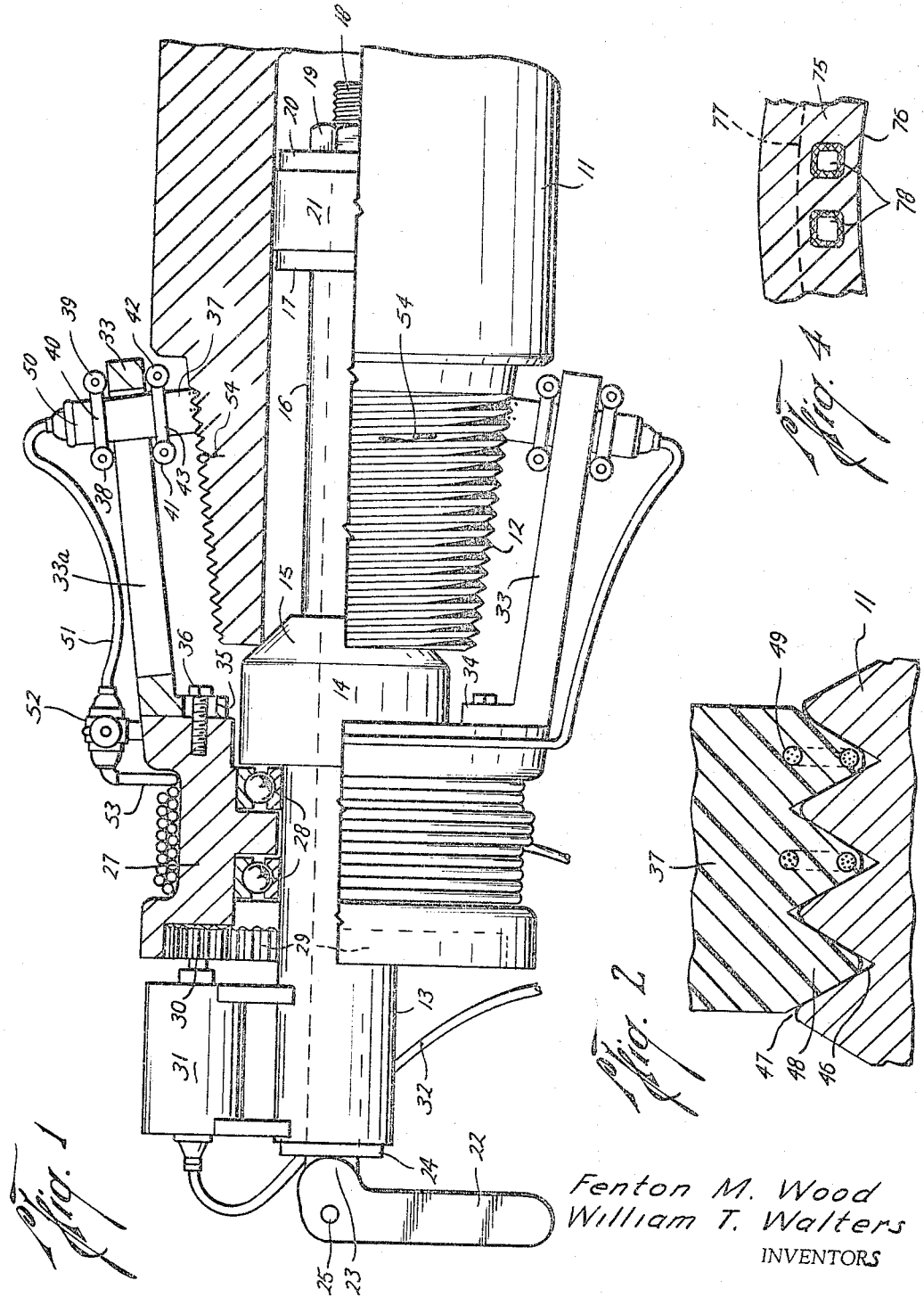

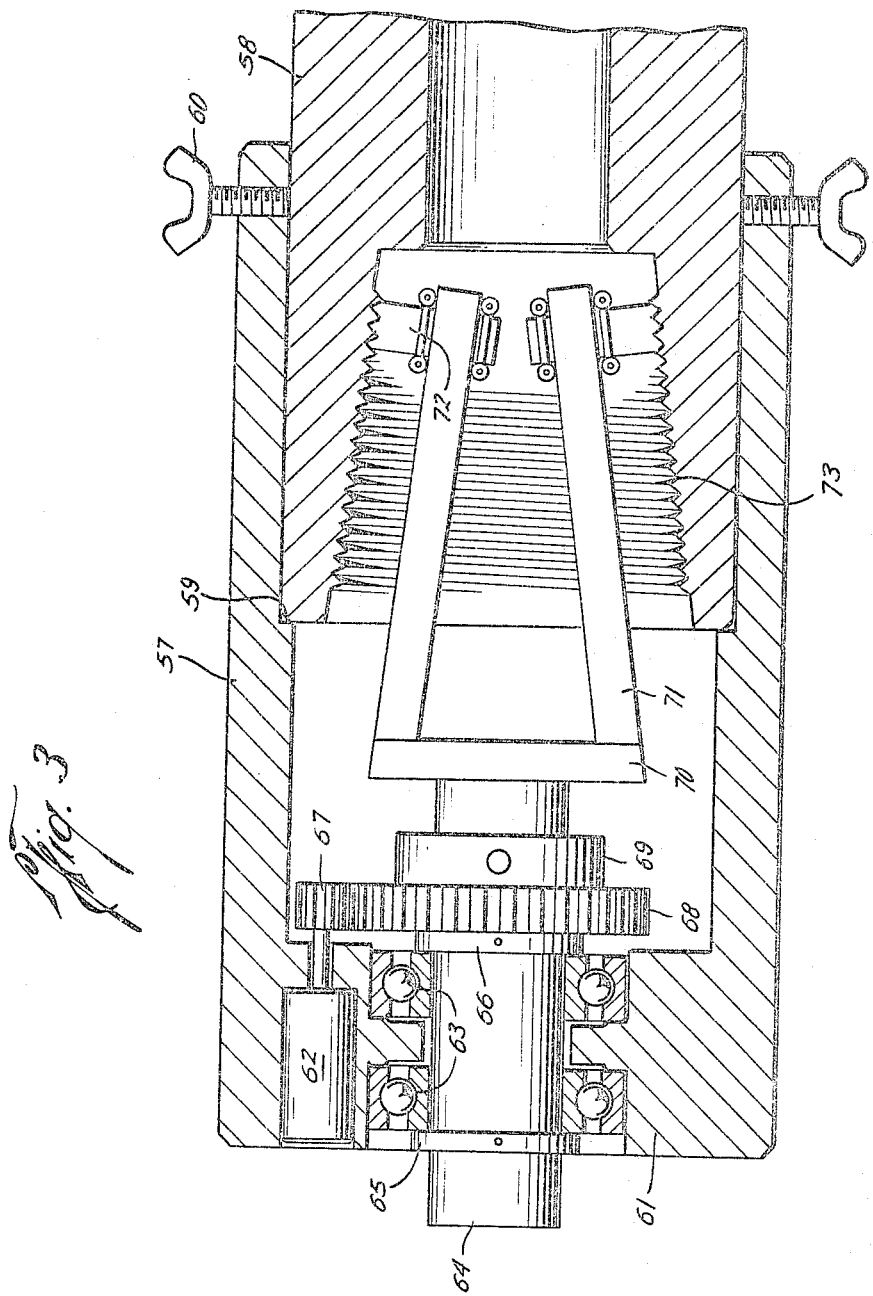

3,327,205
PIPE THREAD INSPECTION APPARATUS UTILIZING A THREADED SENSOR FOR ENGAGING THE THREADS OF THE PIPE
Fenton M. Wood, Sugarland, and William T. Walters, Houston, Tex., assignors to American Machine & Foundry Company, New York, N.Y., a corporation of New Jersey
Filed Feb. 26, 1964, Ser. No. 347,571
9 Claims. (Cl. 324—37)

This invention relates to a pipe thread inspection apparatus. More particularly, this invention relates to a novel apparatus for inspecting the threaded ends of pipe for defects.

In the pipe inspection art there has long been need for an apparatus which could easily and accurately inspect the threaded ends of pipe or tubular goods for defects and which inspection would be accurate and require a minimum of operator time. In the use of tubular goods, such as drill pipe or the like, there will quite often develop therein certain fatigue cracks, which cracks often start at the root of the threads of the pipe and extend circumferentially part way around the pipe.

Heretofore it has been a usual practice to magnetize such a pipe or provide it with a residual magnetic field and thereafter dust fine particles of iron on the area to ascertain whether or not there are any defects of the type referred to above. However, this type of inspection has serious limitations inasmuch as the threads must first be cleansed of any oil or the like. If any oil is left on the threads, the iron particles will tend to cling thereto, thus increasing the difficulty of subsequent makeup of the pipe. Since the type of defects refer to above usually start at the root of the thread, those inspection devices which inspect on the opposite side of the wall of the pipe from the threads are usually not sufficiently accurate.

Hence, there is need for an inspection device which can inspect close to the root of the threads of the pipe and will accomplish this inspection without unnecessary cleaning of the pipe threads. Moreover there is need for an apparatus which can inspect both external threads, such as pin threads on drill pipe, and internal threads, such as box threads on drill pipe.

It is therefore an object of the invention to provide a novel and improved apparatus for inspecting the threaded ends of pipe for fatigue defects which usually start at the root of the thread being inspected.

It is a further objective of this invention to provide an improved apparatus for inspecting the threaded ends of pipe, which ends do not require special cleansing prior to the inspection thereof.

It is another objective of this invention to provide an improved apparatus for inspecting the threads on used pipe wherein the searching means is passed adjacent to the root of the thread of the pipe being inspected.

These and other objectives will be obivous by reference to the description herein.

Briefly stated, this invention provides an apparatus for inspecting threaded ends of pipe and has a housing which is adapted for securing to the end of the pipe being inspected. A rotor is connected to or supported by the housing, with the rotor adapted for circumferential rotation with respect to the central axis of the pipe. Guide means are supported by or attached to the rotor such that the guide means is held adjacent to the threads to be inspected. At least one search shoe is mounted on the guide means so that the shoe may move longitudinally with respect to the pipe while being supported by the guide means. The search shoe has a threaded portion for engagement with the threads to be inspected. In other words, the shoe has matching threads such that the tooth of the thread on the shoe will ride in the root of the pipe thread being inspected.

The apparatus also includes magnetic responsive means, such as search coils, magnetometers, Hall effect detectors, or the like, which are connected to appropriate electrical detection circuits. The magnetic responsive means is mounted in the threaded portion of the shoe and preferably is embedded in the tooth of the thread of the shoe so that the magnetic responsive means is passed in very close proximity to the root of the pipe threads.

Means is provided in the apparatus for rotating the rotor whereby the shoe follows the thread being inspected and is moved helically thereby. In other words, the search shoe is made to follow the pipe thread in much the same manner that a nut would follow the pipe thread if a nut were threaded thereon.

Reference to the drawings will further explain the invention herein, where:

FIG. 1 is a side elevation view partially in central section showing one embodiment of the apparatus for inspecting external or pin threads on pipe.

FIG. 2 is an enlarged fragmentary view of the search shoe shown in FIG. 1.

FIG. 3 is a central sectional view of another embodiment of the apparatus which is adapted for searching internal threads or box threads.

FIG. 4 is a fragmentary sectional view through the tooth of the thread on a search shoe showing another arrangement of the magnetic responsive means of this invention.

Referring now to FIG. 1, one embodiment of the invention will be discussed in detail. Pipe 11, which is a drill pipe, or may be any other type of metalic tubuar goods, is provided with pin threads 12, which are tapered radially inward toward the end thereof. A tool housing is provided for insertion into the end of the pipe and is comprised of tubular housing 13, which is connected to an annular centering member 14, having a tapered fore portion 15 to which is secured a sleeve 16 which extends into pipe 11. On the end of sleeve 16 there is supported an annular shaped disc 17. Tapered portion 15 is in the shape of a cone and helps center the apparatus on the end of the pipe.

Passing axially through housing 13, centering member 14, sleeve 16, and extending out the end thereof is a long bolt 18, having a nut 19 threaded on the front end thereof, which nut supports disc 20. Annular rubber packer 21 is mounted on bolt 18 between discs 17 and 20. Rubber packer 21 is of such diameter that when it is compressed by the movement of discs 17 and 20 axially together, it will be extended outwardly and into contact with the inside surface of the pipe wall.

The opposite end of bolt 18 projects out of tubular housing 13 and is provided with a transverse opening therethrough, in which pin 25 is inserted for supporting handle 22, which has an enlarged camming surface or portion 23, which engages an annular washer 24 mounted about the end of bolt 18 and supported against the end of housing 13. By pressing downwardly on handle 22 to the position shown in FIG. 1, bolt 18 is moved axially to the left as shown in FIG. 1, hence forcing disc 20 closer to disc 17, thereby pressing rubber packer 21 radially outward to engagement with the wall of pipe 11. To release rubber packer 21, handle 22 is merely rotated upward so that bolt 18 may move axially to the right, thus taking pressure off packer 21. The foregoing generally describes the manner by which the apparatus is secured to the end of the pipe being inspected.

A rotor in the form of cable reel 27 is mounted on tubular housing 13 just back of centering member 14 by means of annular bearings 28, such that reel 27 rotates about the central axis of the pipe when the housing is secured or attached to the end of pipe 11. The rearward end or left end of reel 27, as seen in FIG. 1 is provided with internal ring gear 29 which is adapted to be engaged by spur gear 30, which in turn is connected to and rotated by electrical motor 31 mounted on the rearward end of tubular housing 13. Motor 31 is connected to an appropriate power source by power cable 32 which is connected to an appropriate control panel.

Guide means are attached to and supported by the front or right hand side of reel 27 as seen in FIG. 1, which guide means conveniently take the form of guide arms 33, each of which has a radially inward extending lug 34, which has a notch 35 therein through which bolt 36 passes and screws into the leading edge of reel 27. Hence, guide arms 33 are supported by and attached to reel 27. It is to be understood that guide arms 33 could take a different form and attach to reel 27 at a different angle, whereby different size threads could be inspected and/or larger diameter pipe threads could be inspected. Other guide arms could be substituted by removing bolts 36. Moreover, guide arms 33 can be moved radially inward and outward by loosening bolts 36 and sliding guide arms 33 in slots 35 and subsequently tightening bolts 36 again. In certain embodiments the guide arms 33 might be spring mounted such that they would be resiliently biased inwardly.

Guide arms 33 have a longitudinal slot 33a therein in which is inserted for longitudinal movement therewith search shoes 37. These shoes may be made of plastic or other suitable material. Shoes 37 are attached to and supported by guide arms 33 by means of two small carriages which fit on either side of guide arms 33 with one carriage being formed by rollers 38 and 39 connected by brace 40 which is attached to shoe 37. The other carriage is formed by rollers 41 and 42, which are supported by brace 43 which is also attached to shoe 37.

The radially inward end of shoe 37 is provided with a threaded portion with threads shaped to mate with the threads of the pipe being inspected, as best shown in FIG. 2. There it will be seen that pipe 11 is provided with a thread which has a root 46 and crest 47. Tooth 48 of the thread of the shoe fits down into and is held in close proximity to root 46 of the pipe thread.

It will also be observed that magnetic responsive means conveniently in the form of two spaced apart search coils 49 are embedded in search shoe thread tooth 48 and are axially spaced apart in separate turns of tooth 48. The central axis of coils 49 are generally parallel with the central axis of pipe 11. Coils 49 are connected to appropriate leads (not shown) in search shoe 37, which leads connect with connector 50 on the outside end of shoe 37. Connector 50 is attached to connecting cable 51, which attaches to another connector 52 mounted on reel 27. Connector 52 also connects with cable 53, which is wound on reel 27 with enough turns thereof to at least equal the number of turns on the pipe thread to be inspected. Cable 53 is also connected to an appropriate control panel for recording the defects detected by search coils 49.

Coils 49 are very small in size, thus permitting their positioning in close proximity to root 46 of the thread being inspected. Coils 49 are connected to a suitable eddy current detection circuit in one embodiment of the invention. Such an eddy current circuit might be one of any number of circuits such as that taught in U.S. Patent No. 2,353,211. It is to be understood that other types of magnetic responsive means could be used, as for example, search coils which were responsive to flux leakage from the pipe threads in those instances where the pipe threads are provided with a magnetic field. Other magnetic responsive means which could be used include Hall effect detectors, magnetometers, or the like. In any event, the different types of searching devices here referred to and which may be used will for purposes of convenience be referred to as magnetic responsive means. Search coils 49 are particularly sensitive to transverse defects such as transverse cracks 54, shown in pipe 11, which cracks are located in the root of the pipe thread. By having the central axis of coils 49 generally parallel with the central axis of the pipe 11, the coils are much more sensitive to defects of the type illustrated by cracks 54.

In operation, the apparatus would be inserted in the end of pipe 11 as shown in FIG. 1 and handle 22 would be pushed downwardly in the position shown, thereby securing rubber packer 21 inside pipe 11. With the apparatus thus secured, and with shoes 37 in the most rearward position or left position as seen in FIG. 1, power is supplied to electric motor 31, which would cause reel 27 to rotate. As shoes 37 engage threads 12, they will be moved longitudinally in the slots in arms 33 and at the same time be moved helically to follow the pitch of the pipe thread. If coils 49 should pass over any defects, those defects would be detected thereby and recorded or otherwise indicated by the eddy current network connected thereto or other appropriate defect sensing circuit. When shoes 37 have moved to their most forward position or to the right as shown in FIG. 1, motor 31 is then reversed and the shoes are then threaded or removed from the pipe threads in just the reverse procedure.

It is to be understood that the leading edges of shoes 37 could be provided with a metal scrapper or metal point which would cleanse the pipe thread as shoes 37 moved along. After completion of the inspection operation, the tool may be removed from the end of the pipe by lifting up on handle 22 and pulling outwardly on the tool. It could then be mounted on the end of another pipe for another inspection operation. The foregoing generally describes one embodiment of the invention for searching outside or pin threads on pipe.

FIG. 3 shows another embodiment of the invention herein which apparatus is designed for inspecting internal threads or box threads. There it will be seen that tubular support housing 57 is designed to surround the end of pipe 58 with shoulder 59 of housing 57 butting up against the end of pipe 58. The forward end or right end as viewed in FIG. 3 of housing 57 is provided with wing clamp screws 60, which may be turned so as to engage pipe 58 and thereby secure the tool to the end of the pipe. The back end or left end of housing 57 as viewed in FIG. 3 has a radially inwardly extending portion 61 which is annular in shape and supports electric motor 62 and bearings 63 which bearing are mounted on shaft 64, having collars 65 and 66 on each end thereof.

Motor 62 is designed to drive pinion gear 67, which in turn drives spur gear 68, which is mounted on shaft 64, and held there by hub 69.

The guide means in this embodiment take the form of annular guide arm mounting 70 attached to the forward end of shaft 64. A pair of guide arms 71 are attached to mounting 70 and support search shoes 72 in the same manner that shoes 37 were mounted on guide arms 33 in FIG. 1. Moreover, search shoes 72 as well as the magnetic responsive means of the embodiment shown in FIG. 3 are similar to those shown in FIG. 1 and described in reference thereto. Appropriate reel means may be mounted on the rearward end of shaft 64 to provide for the take-up and play-out of appropriate cables which are connected to the magnetic responsive means mounted in search shoes 72.

In operation, housing 57 would be positioned on the end of pipe 58, and secured there by tightening up on screws 60. With shoes 72 in the rearward or retracted position, motor 62 is started, which turns gear 68 and shaft 64 with shoes 72 engaging box thread 73. The shoes 72 will move axially or longitudinally on guide arms 71 and also helically to follow the pitch of box thread 73, thereby inspecting the thread as they moved along. When shoes 72 reach the forward position, motor 62 is reversed and the pipe thread inspected in the rearward movement also. Again, it is to be understood that shoes 72 are provided with appropriate magnetic responsive means, such as search coils connected to an appropriate eddy current detection circuit. Alternatively, the search coils could be adapted to be responsive to a magnetic field provided in the end of pipe 58. Moreover, other magnetic responsive means, such as magnetometers or Hall effect detectors could be used. It is to be understood that the magnetic responsive means used are connected to appropriate defect detecting electrical circuits in the same manner as shown in FIG. 1.

Referring now to FIG. 4, an alternative arrangement of the search coils is shown. In this instance there is shown a circumferential fragmented cross sectional view of the tooth of one of the search shoes. The tooth of the thread on the search shoe is shown as tooth 75, the crest of which is shown as numeral 76, and the root by dotted line 77. In this instance, two coils 78 are embedded in tooth 75 and are circumferentially spaced apart with respect to each other. In this embodiment the central axes of coils 78 are still generally parallel with the central axis of the pipe during inspection. This arrangement of coils 78 is particularly useful in performing certain inspection operations on certain threads which may be relatively small in size. Coils 78 would, of course, be connected with appropriate eddy current detection circuit or other defect type sensing circuits just as were coils 49 shown in FIG. 2.

Further modifications may be made in the invention as particularly described without departing from the scope of the invention. Accordingly, the foregoing description is to be construed illustrative only and is not to be construed as a limitation upon the invention as defined in the following claims.

What is claimed is:

1. In an apparatus for inspecting threaded ends of pipe comprising:
    a housing for securing to the end of said pipe,
    a rotor connected to said housing for circumferential rotation with respect to the central axis of said pipe,
    guide means supported by said rotor and held adjacent to the pipe thread to be inspected,
    at least one search shoe mounted on said guide means for longitudinal movement with respect to said pipe and having a threaded portion for engaging said pipe thread to be inspected,
    magnetic responsive means mounted in said threaded portion of said shoe for detecting defects in the thread of said pipe being inspected, and
    means for rotating said rotor.

2. The apparatus as claimed in claim 1 wherein:
said magnetic responsive means includes at least two coils connected to an eddy current detection circuit.

3. The apparatus as claimed in claim 1 wherein:
said magnetic responsive means includes at least two coils embedded in the thread tooth of said search shoe with the central axes thereof generally parallel with the central axis of said pipe.

4. The apparatus as claimed in claim 1 wherein:
said magnetic responsive means includes at least two search coils embedded in adjacent turns of the thread tooth of said search shoe, with said coils being longitudinally spaced apart from each other and having the central axes thereof generally parallel with the central axis of said pipe.

5. The apparatus as claimed in claim 1 wherein:
said magnetic responsive means includes at least two search coils embedded in the thread tooth of said search shoe, with said coils being circumferentially spaced apart from each other and having the central axes thereof generally parallel with the central axis of said pipe.

6. The apparatus as claimed in claim 1 wherein:
said guide means includes a plurality of support arms, each of which has mounted thereon a search shoe having a matching thread for engaging the thread of said pipe being inspected, and
said magnetic responsive means are embedded in the thread teeth of said search shoes.

7. In an apparatus for inspecting threaded ends of pipe comprising:
    a housing for securing to the end of said pipe,
    a rotor supported by said housing and mounted for circumferential rotation with respect to the central axis of said pipe,
    guide means attached to said rotor for rotation therewith and held adjacent to the pipe thread to be inspected,
    a plurality of search shoes mounted on said guide means for longitudinal movement with respect to said pipe and having matching threads for engagement with the thread of said pipe being inspected,
    magnetic responsive means mounted in the thread tooth of each of said shoes for detecting defects in the thread of said pipe being inspected, and
    means for rotating said rotor, whereby said shoes follow the thread being inspected and are moved helically thereby.

8. The apparatus as claimed in claim 7 wherein:
said guide means extend on the outside of said pipe whereby said magnetic responsive means inspect external threads on said pipe.

9. The apparatus as claimed in claim 7 wherein:
said guide means extend into the end of said pipe whereby said magnetic responsive means inspect internal threads on said pipe.

References Cited

UNITED STATES PATENTS 2,983,141   5/1961   Vanator _____ 324—34

RUDOLPH V. ROLINEC, *Primary Examiner.*

R. B. WILKINSON, *Examiner.*

R. J. CORCORAN, *Assistant Examiner.*